(12) United States Patent
Huang et al.

(10) Patent No.: US 9,747,146 B2
(45) Date of Patent: Aug. 29, 2017

(54) METHOD AND SYSTEM FOR MEMORY ACCESS PROTECTION

(71) Applicant: MARVELL WORLD TRADE LTD., St. Michael (BB)

(72) Inventors: Haitao Huang, Shanghai (CN); Ye Fan, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 614 days.

(21) Appl. No.: 14/248,638

(22) Filed: Apr. 9, 2014

(65) Prior Publication Data

US 2014/0344543 A1    Nov. 20, 2014

Related U.S. Application Data

(60) Provisional application No. 61/824,121, filed on May 16, 2013.

(51) Int. Cl.
*G06F 11/07* (2006.01)
*G06F 9/38* (2006.01)
*G06F 9/455* (2006.01)

(52) U.S. Cl.
CPC ......... *G06F 11/073* (2013.01); *G06F 9/3861* (2013.01); *G06F 11/0793* (2013.01); *G06F 9/4552* (2013.01)

(58) Field of Classification Search
CPC ... G06F 11/073; G06F 11/0793; G06F 9/3861
See application file for complete search history.

(56) References Cited

U.S. PATENT DOCUMENTS

| | | | | |
|---|---|---|---|---|
| 8,307,432 B1 * | 11/2012 | Feng | ............... | G06F 21/56 726/22 |
| 2005/0216711 A1 * | 9/2005 | Butcher | ............. | G06F 9/30174 712/233 |
| 2005/0257096 A1 * | 11/2005 | Kielstra | ............... | G06F 8/4441 714/42 |
| 2009/0043989 A1 * | 2/2009 | Perfetta | ............... | G06F 9/30021 712/210 |

* cited by examiner

*Primary Examiner* — Aracelis Ruiz

(57) ABSTRACT

Aspects of the disclosure provide a method for null address handling. The method includes compiling code without adding a null check code before a memory access code, storing a first address of the memory access code in association with a second address of a handling code for null address, determining, in response to an exception that occurs at the first address during an execution of the compiled code, the second address based on the stored information, and executing the handling code at the second address.

17 Claims, 7 Drawing Sheets

Java code:
```
class iGet{
    public int num;
    public static void main(String[] args){
        int i;
        iGet obj1= new iGet();
        for (i=0; i < 100000000; ←——— 415
        i++){
            obj1.num += 1;
        }
    }
}
```
↗ 410

Fig. 4A

```
Bytecode:
000b: iget v2, v0, iGet.num:I
000d: add-int/lit8 v2, v2, #int 1
000f: iput v2, v0, iGet.num:I
```

Fig. 4B

```
Native code:
------ offset: 0x000b iget-quick v2, v0, (#8)

0x46692010 (0010): ldr    r0, [r5, #0]
0x46692012 (0012): ldr    r1, [r0, #8]      ← 435
0x46692014 (0014): str    r1, [r5, #8]

...
L0x438393b4:
------ reconstruct PC : 0x400e116a @ +0x000b
0x46692044 (0044): ldr    r0, [r15pc, #60]  ← 445
Exception_Handling:
0x46692048 (0048): ldr    r1, [r6, #108]
0x4669204a (004a): blx    r1
```

*Fig. 4C*

```
static bool is_null_check_fault(pid_t pid, unsigned long addr, struct pt_regs *regs)
{
    /* handle_addr is the handler address */
    unsigned long handle_addr;
    /* check if the address is in the "null addresses table" */
    if (in_null_addresses_table(pid, addr, &handle_addr))
    {
        /* change the pc value in the user mode to the handler address */
        regs->pc = handle_addr;

/* return to the user mode */
        return true;
    }
} static void __do_user_fault(struct task_struct *tsk, unsigned long addr, unsigned int fsr,
unsigned int sig, int code, struct pt_regs *regs)
{
    ...
    if (is_null_check_fault(current->pid, addr, regs))
    {
        return;
    }
}
```

*Fig. 5*

METHOD AND SYSTEM FOR MEMORY ACCESS PROTECTION

INCORPORATION BY REFERENCE

This present disclosure claims the benefit of U.S. Provisional Application No. 61/824,121, "Method for Delaying Null Check in Java VM" filed on May 16, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a Java virtual machine, such as Dalvik and the like, compiles frequently used Java bytecode into native code to improve runtime performance. In the native code, a null check is performed before a memory access. In an example, before accessing an object, the native code includes a null check code to check whether a reference to the object is null. When the reference is not null, the object is accessed using the reference.

SUMMARY

Aspects of the disclosure provide a method for null address handling. The method includes compiling code without adding a null check code before a memory access code, storing a first address of the memory access code in association with a second address of a handling code for null address, determining, in response to an exception that occurs at the first address during an execution of the compiled code, the second address based on the stored information, and executing the handling code at the second address.

To store the first address of the memory access code in association with the second address of the handling code for null address, in an embodiment, the method includes storing the first address in association with the second address in a table. Further, the method includes searching for the first address in the table, and outputting the second address stored in association with the first address.

Aspects of the disclosure provide a non-transitory computer readable medium storing program instructions for causing a processor to execute operations for null address handling. The operations include compiling code without adding a null check code before a memory access code, storing a first address of the memory access code in association with a second address of a handling code for null address, determining, in response to an exception that occurs at the first address during an execution of the compiled code, the second address based on the stored information, and executing the handling code at the second address.

Aspects of the disclosure provide another method. The method includes compiling, by a Java virtual machine, a code without adding a null check code before a memory access code, storing a first address of the memory access code in association with a second address of a handling code for null address, exiting the Java virtual machine in response to an exception that occurs at the first address during the execution of the compiled code to let a kernel to determine the second address based on the stored information, and returning to the Java virtual machine with the determined second address to execute the handling code at the second address.

BRIEF DESCRIPTION OF THE DRAWINGS

Various embodiments of this disclosure that are proposed as examples will be described in detail with reference to the following figures, wherein like numerals reference like elements, and wherein:

FIGS. 4A-4C show code examples according to an embodiment of the disclosure; and FIG. 5 shows pseudo code example 500 for a kernel according to an embodiment of the disclosure.

DETAILED DESCRIPTION OF EMBODIMENTS

Figure 1:
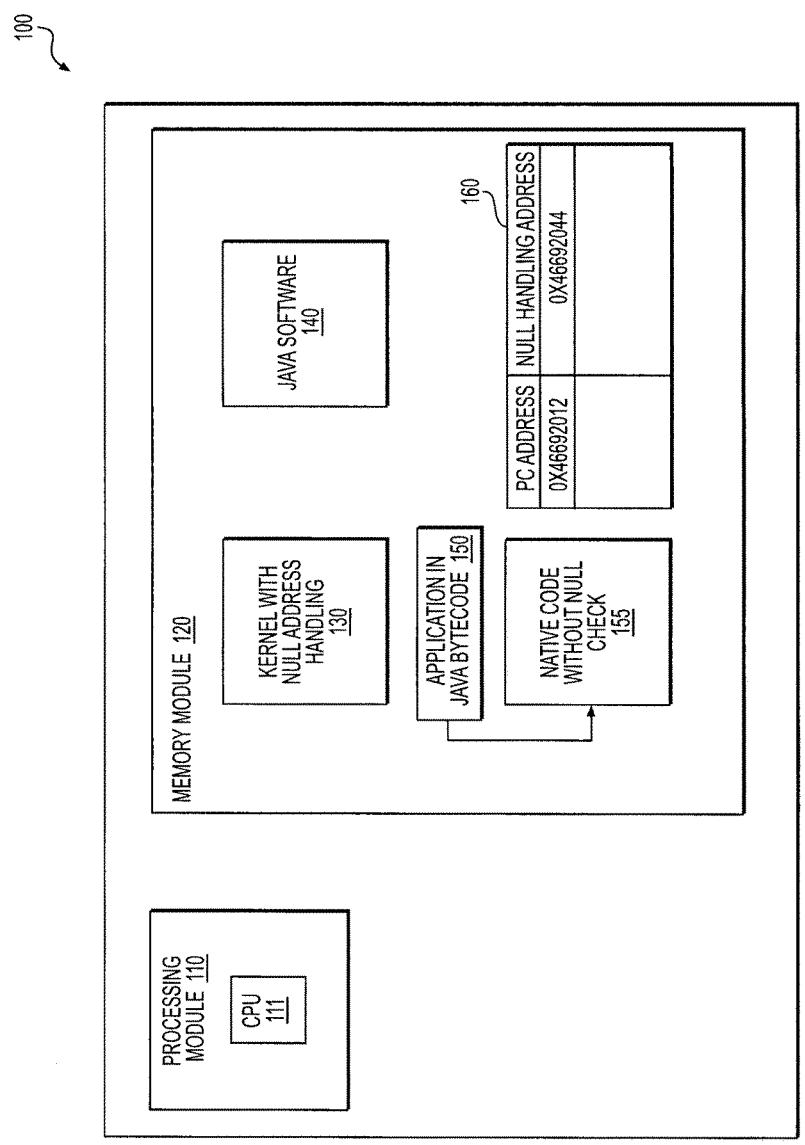
FIG. 1 shows a block diagram of a system example 100 according to an embodiment of the disclosure.

FIG. 1 shows a block diagram of a system example 100 according to an embodiment of the disclosure. The system 100 includes hardware components, such as a processing module 110, a memory module 120, and the like, and software components, such as various code instructions stored in the memory module 120. The hardware components operate according to the software components to perform various tasks.

The system 100 can be any suitably system, such as a desktop computer, a laptop computer, a tablet computer, a smart phone, and the like. The system 100 can include other suitable components (not shown), such as a display, a touchscreen, a microphone, a communication component, and the like. In an embodiment, the system 100 includes a single integrated circuit (IC) chip that integrates various circuits, such as the processing module 110, the memory module 120, and the like on the single IC chip. In another embodiment, the system 100 includes multiple IC chips, such as a processor chip, a memory chip and the like.

The processing module 110 includes one or more processors, such as a central processing unit (CPU) 111, and the like, to execute various code instructions to perform various tasks. The code instructions can be low level code, such as machine code (native code), that can be directly executed by the CPU 111 or can be high level code, such as in Java language, in C language and the like, that can be translated to the machine code and then executed.

The CPU 111 can be implemented using any suitable architecture, such as x86, ARM, and the like. In an example, when the CPU 111 has the x86 architecture, the CPU 111 is able to execute machine code in a x86 instruction set that is specific for the x86 architecture. In another example, when the CPU 111 has the ARM architecture, the CPU 111 is able to execute machine codes in an ARM instruction set that is specific for the ARM architecture.

The memory module 120 includes one or more storage media that provide memory space for various storage needs. In an example, the memory module 120 stores code instructions to be executed by the processing module 110 and stores data to be processed by the processing module 110. In another example, the memory module 120 includes memory spaces allocated for system storage, and includes memory spaces allocated for user storage.

The storage media include, but are not limited to, hard disk drive, optical disc, solid state drive, read-only memory (ROM), dynamic random access memory (DRAM), static random access memory (SRAM), flash memory, and the like.

According to an aspect of the disclosure, the memory module 120 stores various computer programs, such as system programs, application programs, and the like. Each computer program includes code instructions to be executed to perform a task. In the FIG. 1 example, a memory space 130 is allocated in the memory module 120 to store a program for a kernel. The kernel is a part of an operating system for the system 100 that interfaces user application programs with the hardware components of the system 100. For example, the kernel manages input/output requests from software components, such as the user application programs and the like, and translates them into data processing instructions for the hardware components, such as the processing module 110, the memory module 120 and the like.

Further, in the FIG. 1 example, a memory space 140 is allocated in the memory module 120 to store a Java software program that is suitable for the system 100. The Java software program is installed in the system 100 to provide a Java runtime environment (JRE), such that Java bytecode can be executed in the system 100. In an example, the Java software program is executed to start a Java virtual machine in the system 100 for executing Java bytecode. In an example, the system 100 is an Android system, and the memory space 140 stores Dalvik software program for the Android system.

In an embodiment, source code of a user application program is generated in Java language. The source code is compiled to generate Java bytecode for the application. The Java bytecode is executable by various Java virtual machines. In the FIG. 1 example, a memory space 150 is allocated to store Java bytecode for a user application. To execute the Java bytecode, the system 100 starts the Java virtual machine. The Java virtual machine provides a Java runtime environment for the Java bytecode. After the execution of the Java bytecode, the Java virtual machine is terminated in an example.

According to an aspect of the disclosure, the Java virtual machine uses interpretation and just-in-time (JIT) compilation for Java bytecode execution. In an example, the Java virtual machine detects frequently executed traces, such as paths, loops, and the like, in the Java bytecode, and executes the frequently executed traces in a different manner from the less frequently executed traces. For example, the Java virtual machine tracks a number of executions for a trace. When the number of executions for the trace is less than a threshold (e.g., two), the Java virtual machine executes the trace by interpretation; and when the number of executions for the trace is equal or larger than the threshold, the Java virtual machine uses the JIT compilation to compile the trace of Java bytecode into a trace of native code, and caches the trace of native code in the memory module 120. In the FIG. 1 example, a memory space 155 is allocated as a JIT cache to cache the compiled native code. Then, for further executions of the trace, the Java virtual machine executes the cached native code stored at the memory space 155.

Generally, in Java language, references are used to access object and array members in the memory module 120. To ensure safe memory access, in an example, a Java virtual machine can add a null check code in the native code before a memory access code, such as an object access code, an array member access code, and the like. The null check code checks whether the reference is null, and the code execution flow branches according to the null check. In an example, when the null check is false (e.g., the reference is not null), the Java virtual machine follows the code sequence to execute the memory access code. When the null check is true (e.g., the reference is null), the Java virtual machine changes code sequence to execute null handling code that handles the null reference situation.

According to an aspect of the disclosure, the added null check code takes extra clock cycles to execute. In addition, because the code execution flow branches at the null check code, the null check code is the boundary for instruction scheduling. Thus, the added null check code causes a code scope reduction for code optimization.

According to the aspect of the disclosure, the Java virtual machine in the system 100 does not add null check in the native code before a memory access code, such as an object access code, an array member access code, and the like. Instead, the Java virtual machine adds an entry in a null address table, such as a table 160 stored in the memory module 120. The entry stores an address of the memory access code in association with an address of the null handling code. In the FIG. 1 example, the table 160 includes a first field (PC ADDRESS) for storing the address of the memory access code in the native code and a second field (NULL HANDLING ADDRESS) for storing the address of the null handling code.

During operation, when the reference for the memory access code is not null, the native code is sequentially executed. Because the native code does not have the null check code, the clock cycles for the execution of the null check code are saved. In addition, without the scheduling boundary due to the null check code, the code scope for code optimization is enlarged. Then, a larger scope of native code can be optimized to further improve the Java virtual machine performance.

However, when the reference for the memory access code is null or close to null, the reference points to a system space that is generally protected from user access, generally, the system 100 exits the application program, and enters an exception handling function in the kernel. According to an aspect of the disclosure, the kernel of the system 100 determines an address of a null handling code. Then, the system 100 returns to the application program at the address of the null handling code. In an embodiment, the kernel of the system 100 determines the address of the null handling code according to the address of the memory access code that causes the exception (e.g., the address in the program counter (PC) of the system 100), for example, based on the table 160. In an example, the kernel searches the address of the memory access code in the table 160. When the kernel finds an entry in the table 160 with the address of the memory access code in the first field, the kernel obtains the address of the null handling code stored in the second field of the entry. Then, the system 100 returns to the application program to execute the null handling code at the determined address.

Figure 2:
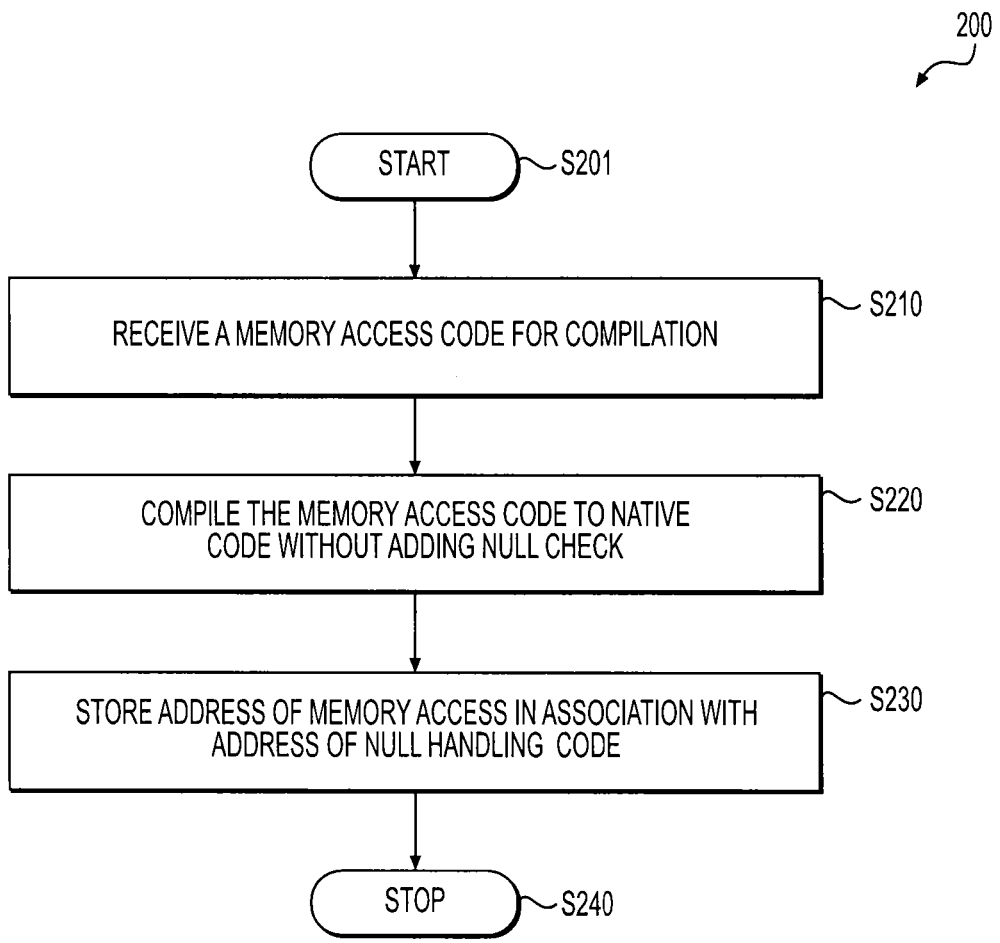
FIG. 2 shows a flow chart outlining a compilation process 200 according to an embodiment of the disclosure.

FIG. 2 shows a flow chart outlining a process example 200 for compilation according to an embodiment of the disclosure. In the FIG. 1 example, an application program in Java language is translated into Java bytecode, and the Java bytecode is stored at the memory space 150 in the memory module 120. In an embodiment, to execute the Java bytecode, the system 100 executes the Java software program stored at the memory space 140 to start the Java virtual machine. The Java virtual machine provides Java runtime environment for executing the Java bytecode. In an example, the Java virtual machine uses JIT compilation to compile a frequently used trace of Java bytecode into native code, and the Java virtual machine executes the compiled native code to improve performance. In the example, the Java virtual machine uses the process 200 to compile a memory access code from the Java bytecode to the native code. The process starts at S201 and proceeds to S210.

At S210, a memory access code is received for compilation. In an example, the memory access code is in a trace of frequently used Java bytecode.

At S220, the memory access code is compiled into the native code without adding null check. In an example, the Java virtual machine in the system 100 compiles the memory access code from the Java bytecode to the native code without adding a null check code before the memory access code in the native code.

At S230, an address of the memory access code in the native code is stored in association with an address of a null handling code for handling null at the memory access code. In the FIG. 1 example, the address of the compiled memory access code in the native code is stored in the first field of an entry in the table 160, and an address of the null handling code for handling the null reference at the memory access code is stored in the second field of the entry. Then the process proceeds to S240 and terminates.

It is noted that the process 200 can be repetitively used to compile any memory access codes in the frequently used trace of Java bytecode to the native code.

Figure 3:
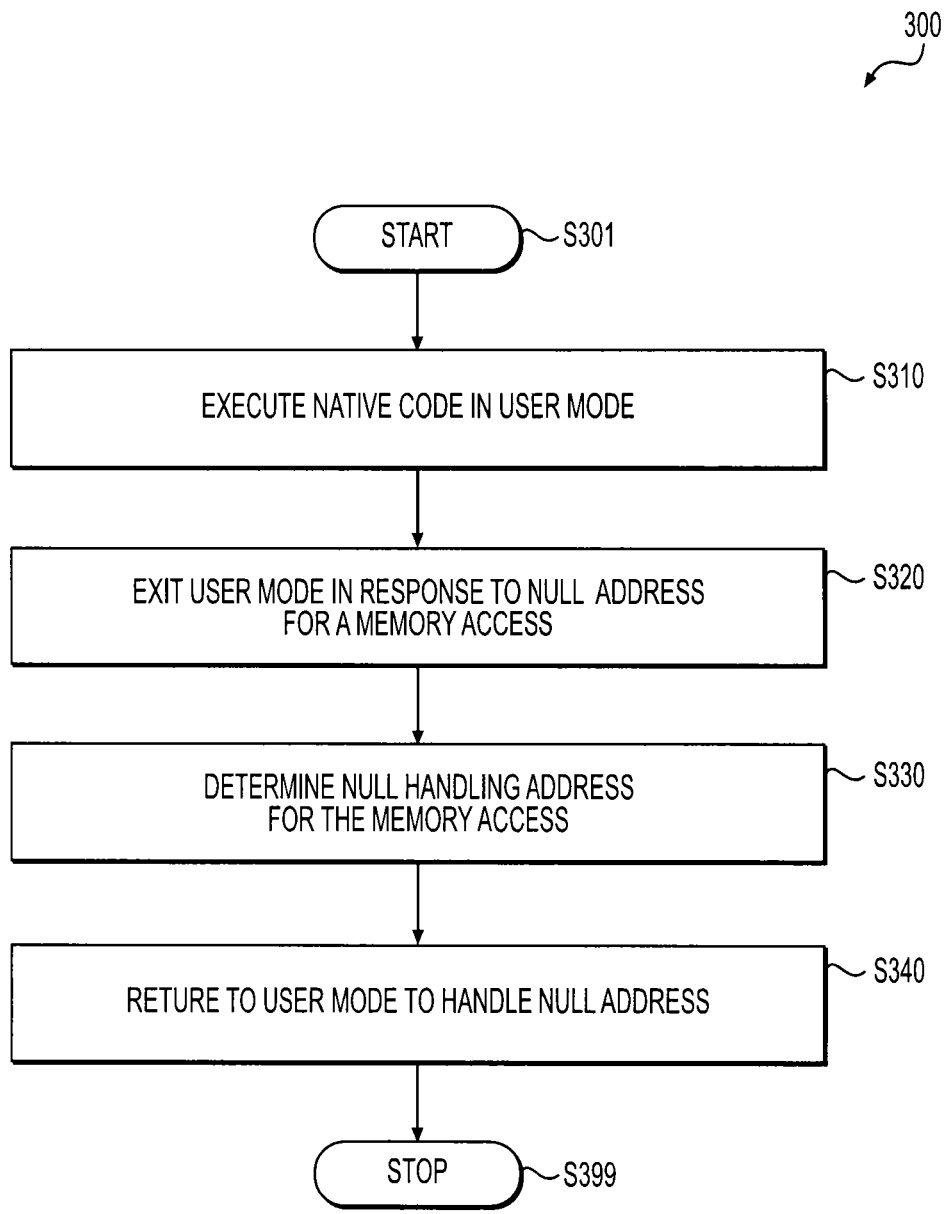
FIG. 3 shows a flow chart outlining a process 300 for null address handling according to an embodiment of the disclosure.

FIG. 3 shows a flow chart outlining a process 300 for null address handling at runtime according to an embodiment of the disclosure. In the FIG. 1 example, the Java virtual machine in the system 100 compiles the frequently used Java bytecode into native code without adding null check, and then executes the native code. The process 300 is used by the system 100 to handle null address situation. The process starts at S301 and proceeds to S310.

At S310, a system executes native code in a user mode. In the FIG. 1 example, when the system 100 executes code for a user application, such as the application stored at the memory space 150, the system 100 is in the user mode. Further, in the FIG. 1 example, the frequently used trace of Java bytecode in the application is compiled into the native code without null check stored at the memory space 155, and the native code is executed by the system 100 in the user mode.

At S320, the system exits the user mode in response to a null reference for a memory access. In the FIG. 1 example, because the native code does not include null check code before memory access code, when the reference for memory access is null or close to null, a specific signal (e.g., SIGSEGV) is generated to signal the system 100 of a segmentation violation, and the system 100 exits the user mode, and enters an address exception mode in response to the specific signal.

At S330, the system determines an address of null handling code for the memory access code. In the FIG. 1 example, when the system 100 is in the address exception mode, the kernel searches the first field in the table 160 for the address of memory access code in the native code in an embodiment. When the kernel finds a match in an entry, the kernel extracts the address of the null handling code in the second field of the entry. In an example, the table 160 is stored in a memory space allocated for user storage, and the kernel uses a system call, such as ioctl( ) to access the table 160.

At S340, the system 100 returns to the user mode to handle the null address. In the FIG. 1 example, the program counter is set to the address of the null handling code, and the system 100 returns to the user mode to execute the null handling code to handle the null address. Then the process proceeds to S399 and terminates.

FIG. 4A shows a portion of an application code 410 in Java language. The application code 410 includes an object access code 415.

FIG. 4B shows a portion of an application code 420 in Java bytecode. In an embodiment, the application code 410 is compiled into the application code 420. The application code 420 includes an object access code 425 corresponding to the object access code 415 in FIG. 4A. In the FIG. 1 example, the application code 420 is stored at the memory space 150 for example.

FIG. 4C shows a portion of an application code 430 in native code. In an example, a Java virtual machine compiles a frequently used trace of the application code 420 into the application code 430 at run time. The application code 430 in the native code includes an object access code 435 corresponding to the object access code 425 in FIG. 4B. It is noted that the application code 430 does not include a null check code (e.g., cbz instruction) before the object access code 435. Using the example in FIG. 1, the application code 430 is stored at the memory space 155 allocated for the JIT cache for example. The object access code 435 is cached at an address (e.g., 0x46692012) in the JIT cache. It is noted that application code 430 includes a null handling code 445 that starts at an address (e.g., 0x46692044) in the JIT cache to handle null address at the object access code 435.

According to an aspect of the disclosure, the address of the object access code 435 is stored in association with the address of the null handling code 445. In an example, the address of the object access code 435 is stored in the first field in an entry of the table 160, and the address of the null handling code 445 is stored in the second field of the entry at the time of the compilation, as shown in FIG. 1.

FIG. 5 shows pseudo code example 500 for a Linux kernel according to an embodiment of the disclosure. In an example, the Linux kernel is used in the system 100. The Linux kernel includes a function "_do_user_fault" which is called when a memory access code triggers an exception. For example, the function is called in response to the specific signal SIGSEGV.

According to the pseudo code 500, the function checks whether the address of the memory access code that triggers the exception is in a null addresses table, such as the table 160. When the address is in the null addresses table, the program counter is changed to the address of the null handling code stored in association with the address of the memory access code. Then, the function returns to the user mode.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for null address handling, comprising:
  compiling code to generate native code without adding a null check code before a memory access code in the native code and generate an entry in a table including a first address of the memory access code and a second address of a null handling code associated with the memory access at the first address;

determining, in response to an exception that occurs at the first address during an execution of the compiled code, the second address based on the stored information, and executing the handling code at the second address.

2. The method of claim 1, wherein determining, in response to the exception that occurs at the first address during the execution of the compiled code, the second address based on the stored information further comprises:
   searching for the first address in the table; and
   outputting the second address stored in association with the first address.

3. The method of claim 1, wherein determining, in response to the exception that occurs at the first address during the execution of the compiled code, the second address based on the stored information further comprises:
   determining the second address in association with the first address by a kernel.

4. The method of claim 1, wherein compiling the code without adding the null check code before the memory access code further comprises at least one of:
   compiling the code without adding the null check code before an array member access code; and
   compiling the code without adding the null check code before an object access code.

5. The method of claim 1, wherein compiling the code without adding the null check code before the memory access code further comprises:
   compiling, by a Java virtual machine, the code without adding the null check code before the memory access code.

6. The method of claim 5, wherein storing the first address of the memory access code in association with the second address of the handling code for the null address further comprises:
   storing, by the Java virtual machine, the first address of the memory access code in association with the second address of the handling code for the null address.

7. The method of claim 6, wherein determining, in response to the exception that occurs at the first address during the execution of the compiled code, the second address based on the stored information further comprises:
   determining, by a kernel, the second address in association with the first address.

8. The method of claim 7, wherein executing the handling code at the second address further comprises:
   returning to the Java virtual machine to execute the handling code at the second address.

9. A non-transitory computer readable medium storing program instructions for causing a processor to execute operations for null address handling, the operations comprising:
   compiling code to generate native code without adding a null check code before a memory access code in the native code and generate an entry in a table including a first address of the memory access code and a second address of a null handling code associated with the memory access at the first address;
   determining, in response to an exception that occurs at the first address during an execution of the compiled code, the second address based on the stored information, and executing the handling code at the second address.

10. The non-transitory computer readable medium of claim 9, wherein the operation of determining, in response to the exception that occurs at the first address during the execution of the compiled code, the second address based on the stored information further comprises:
    searching for the first address in the table; and
    outputting the second address stored in association with the first address.

11. The non-transitory computer readable medium of claim 9, wherein the operation of determining, in response to the exception that occurs at the first address during the execution of the compiled code, the second address based on the stored information further comprises:
    determining the second address in association with the first address by a kernel.

12. The non-transitory computer readable medium of claim 9, wherein the operation of compiling the code without adding the null check code before the memory access code further comprises at least one of:
    compiling the code without adding the null check code before an array member access code; and
    compiling the code without adding the null check code before an object access code.

13. The non-transitory computer readable medium of claim 9, wherein the operation of compiling the code without adding the null check code before the memory access code further comprises:
    compiling, by a Java virtual machine, the code without adding the null check code before the memory access code.

14. The non-transitory computer readable medium of claim 13, wherein the operation of storing the first address of the memory access code in association with the second address of the handling code for the null address further comprises:
    storing, by the Java virtual machine, the first address of the memory access code in association with the second address of the handling code for the null address.

15. The non-transitory computer readable medium of claim 14, wherein the operation of determining, in response to the exception that occurs at the first address during the execution of the compiled code, the second address based on the stored information further comprises:
    determining, by a kernel, the second address in association with the first address.

16. The non-transitory computer readable medium of claim 15, wherein the operation of executing the handling code at the second address further comprises:
    returning to the Java virtual machine to execute the handling code at the second address.

17. A method for null address handling, comprising:
    compiling, by a Java virtual machine, a code to generate native code without adding a null check code before a memory access code in the native code and generate an entry in a table including a first address of the memory access code and a second address of a null handling code associated with the memory access at the first address;
    exiting the Java virtual machine in response to an exception that occurs at the first address during the execution of the compiled code to let a kernel to determine the second address based on the stored information; and
    returning to the Java virtual machine with the determined second address to execute the handling code at the second address.

* * * * *